US010863362B2

(12) United States Patent
Ahn et al.

(10) Patent No.: US 10,863,362 B2
(45) Date of Patent: Dec. 8, 2020

(54) INTERFERENCE AVOIDANCE IN UNLICENSED BAND

(71) Applicant: LG ELECTRONICS INC., Seoul (KR)

(72) Inventors: Joonkui Ahn, Seoul (KR); Byounghoon Kim, Seoul (KR); Seonwook Kim, Seoul (KR); Changhwan Park, Seoul (KR); Hanjun Park, Seoul (KR); Hanbyul Seo, Seoul (KR); Sukhyon Yoon, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 107 days.

(21) Appl. No.: 16/096,256

(22) PCT Filed: Apr. 28, 2017

(86) PCT No.: PCT/KR2017/004533
§ 371 (c)(1),
(2) Date: Oct. 24, 2018

(87) PCT Pub. No.: WO2017/191939
PCT Pub. Date: Nov. 9, 2017

(65) Prior Publication Data
US 2019/0166503 A1    May 30, 2019

Related U.S. Application Data

(60) Provisional application No. 62/331,399, filed on May 3, 2016, provisional application No. 62/339,060, filed
(Continued)

(51) Int. Cl.
*H04W 16/14* (2009.01)
*H04W 74/08* (2009.01)
*H04B 7/06* (2006.01)

(52) U.S. Cl.
CPC .......... *H04W 16/14* (2013.01); *H04B 7/0617* (2013.01); *H04W 74/0808* (2013.01); *H04W 74/0816* (2013.01)

(58) Field of Classification Search
CPC . H04W 74/08; H04W 74/0816; H04W 16/14; H04W 84/12
See application file for complete search history.

(56) References Cited

U.S. PATENT DOCUMENTS

2008/0025259 A1 *   1/2008   Ponnuswamy ....... H04W 24/00
                                                     370/331
2014/0119307 A1 *   5/2014   Hwang ............. H04W 74/0808
                                                     370/329
(Continued)

FOREIGN PATENT DOCUMENTS

WO    2014210401    12/2014
WO    2015167672    11/2015
(Continued)

OTHER PUBLICATIONS

PCT International Application No. PCT/KR2017/004533, International Search Report dated Jul. 28, 2017, 4 pages.
(Continued)

*Primary Examiner* — Elton Williams
(74) *Attorney, Agent, or Firm* — Lee Hong Degerman Kang Waimey

(57) ABSTRACT

Provided is a communication method for interference avoidance in an unlicensed band. A transmission node transmits in the unlicensed band a preemption signal to a target reception node. Upon receiving a ready signal from the target reception node, the transmission node transmits in the unlicensed band a data signal to the target reception node. The preemption signal is transmitted by means of a narrow beam having substantially the same width and direction as the data signal.

4 Claims, 8 Drawing Sheets

Related U.S. Application Data on May 19, 2016, provisional application No. 62/372,364, filed on Aug. 9, 2016, provisional application No. 62/471,880, filed on Mar. 15, 2017.

(56) References Cited

U.S. PATENT DOCUMENTS

| | | | |
|---|---|---|---|
| 2015/0163825 A1 | 6/2015 | Sadek et al. | |
| 2016/0066325 A1 | 3/2016 | Kim et al. | |
| 2016/0353467 A1* | 12/2016 | Nekovee | H04B 7/0408 |
| 2016/0360553 A1* | 12/2016 | Cheng | H04W 4/08 |

FOREIGN PATENT DOCUMENTS

| | | |
|---|---|---|
| WO | 2016015318 | 2/2016 |
| WO | 2016036081 | 3/2016 |

OTHER PUBLICATIONS

European Patent Office Application Serial No. 17792841.3, Search Report dated Oct. 11, 2019, 9 pages.

LG Electronics, "Candidate solutions for LAA operation", 3GPP TSG RAN WG1 Meeting #78bis, R1-144042, Oct. 2014, 6 pages.

* cited by examiner

INTERFERENCE AVOIDANCE IN UNLICENSED BAND

CROSS-REFERENCE TO RELATED APPLICATIONS

This application is the National Stage filing under 35 U.S.C. 371 of International Application No. PCT/KR2017/004533, filed on Apr. 28, 2017, which claims the benefit of U.S. Provisional Applications No. 62/331,399, filed on May 3, 2016, 62/339,060, filed on May 19, 2016, 62/372,364, filed on Aug. 9, 2016, and 62/471,880, filed on Mar. 15, 2017, the contents of which are all hereby incorporated by reference herein in their entirety.

BACKGROUND OF THE INVENTION

Field of the Invention

The present invention relates to wireless communication and, more particularly, to a method and device for interference avoidance in an unlicensed band.

Related Art

With the explosive increase in mobile data traffic in recent years, a service provider has utilized a wireless local area network (WLAN) to distribute the data traffic. Since the WLAN uses an unlicensed band, the service provider can address a demand for a significant amount of data without the cost of an additional frequency. However, there is a problem in that an interference phenomenon becomes serious due to a competitive WLAN installation between the providers, quality of service (QoS) cannot be guaranteed when there are many users, and mobility cannot be supported. As one of methods for compensating this, a long term evolution (LTE) service in the unlicensed band is emerged.

LTE in unlicensed spectrum (LTE-U) or licensed-assisted access using LTE (LAA) is a technique in which an LTE licensed band is used as an anchor to combine a licensed band and an unlicensed band by the use of carrier aggregation (CA). A user equipment (UE) first accesses a network in the licensed band. A base station (BS) may offload traffic of the licensed band to the unlicensed band by combining the licensed band and the unlicensed band according to a situation.

The LTE-U may extend an advantage of LTE to the unlicensed band to provide improved mobility, security, and communication quality, and may increase a throughput since the LTE has higher frequency efficiency than the legacy radio access technique.

Unlike the licensed band in which exclusive utilization is guaranteed, the unlicensed band is shared with various radio access techniques such as the WLAN. Therefore, each communication node acquires a channel to be used in the unlicensed band in a contention-based manner, and this is called a carrier sense multiple access with collision avoidance (CSMA/CA). Each communication node must perform channel sensing before transmitting a signal to confirm whether a channel is idle, and this is called clear channel assessment (CCA).

It is important to mitigate interference since there are lots of communication nodes in an unlicensed band in which various protocols exist.

SUMMARY OF THE INVENTION

The present invention provides a method for interference avoidance in an unlicensed band and a device using the same.

In an aspect, a method for communicating in an unlicensed band includes transmitting, by a transmission (TX) node, a preemption signal to a target reception (RX) node in the unlicensed band, and if the TX node receives a ready signal from the target RX node, transmitting, by the TX node, a data signal to the target RX node in the unlicensed band. The preemption signal is transmitted by using a narrow beam having substantially the same width and direction as the data signal.

The method may include stopping transmission to the target RX node if the TX node receives at least one stop signal from at least one node.

In another aspect, a device for operating in an unlicensed band includes a transceiver configured to transmit and receive a radio signal, and a processor operatively coupled to the transceiver. The processor is configured to transmit a preemption signal to a target reception (RX) node in the unlicensed band, and transmit a data signal to the target RX node in the unlicensed band if a ready signal is received from the target RX node. The preemption signal is transmitted by using a narrow beam having substantially the same width and direction as the data signal.

Interference can be mitigated in an unlicensed band in which various protocols exist.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc. The wireless device may also be a device supporting only data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

Hereinafter, it is described that the present invention is applied according to a 3rd generation partnership project (3GPP) long term evolution (LTE) based on 3GPP technical specification (TS). However, this is for exemplary purposes only, and thus the present invention is also applicable to various wireless communication networks.

In a carrier aggregation (CA) environment or a dual connectivity environment, the wireless device may be served by a plurality of serving cells. Each serving cell may be defined with a downlink (DL) component carrier (CC) or a pair of a DL CC and an uplink (UL) CC.

The serving cell may be classified into a primary cell and a secondary cell. The primary cell operates at a primary frequency, and is a cell designated as the primary cell when an initial network entry process is performed or when a network re-entry process starts or in a handover process. The primary cell is also called a reference cell. The secondary cell operates at a secondary frequency. The secondary cell may be configured after an RRC connection is established, and may be used to provide an additional radio resource. At least one primary cell is configured always. The secondary cell may be added/modified/released by using higher-layer signaling (e.g., a radio resource control (RRC) message).

A cell index (CI) of the primary cell may be fixed. For example, a lowest CI may be designated as a CI of the primary cell. It is assumed hereinafter that the CI of the primary cell is 0 and a CI of the secondary cell is allocated sequentially starting from 1.

Figure 1:
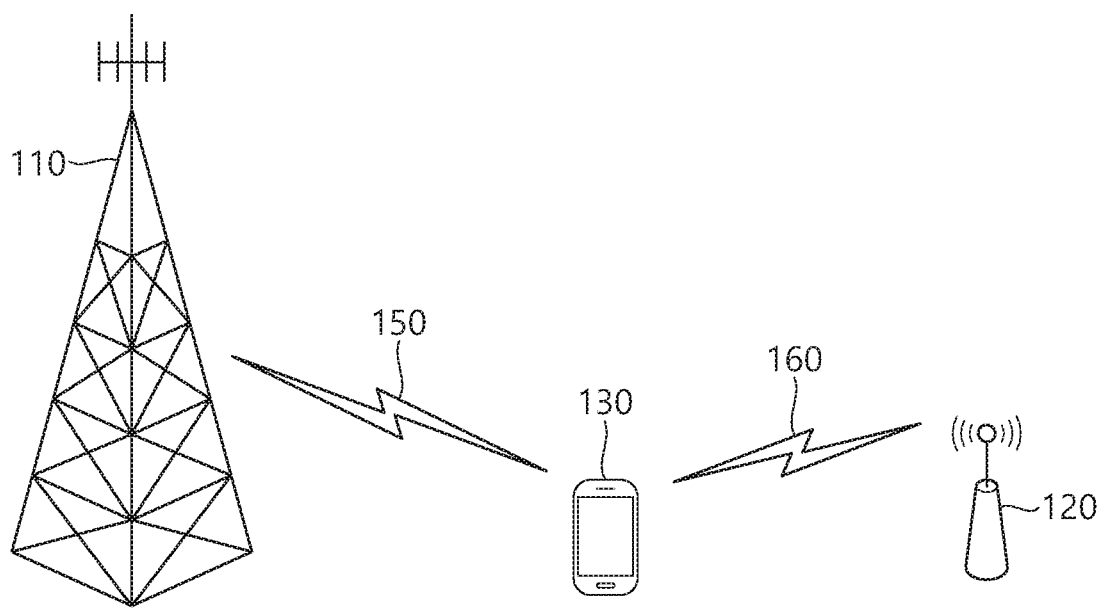
FIG. 1 shows an example of a Long Term Evolution (LTE) service using an unlicensed band.

FIG. 1 shows an example of an LTE service using an unlicensed band.

A wireless device 130 establishes a connection with a 1st BS 110, and receives a service through a licensed band. For traffic offloading, the wireless device 130 may receive a service through an unlicensed band with respect to a 2nd BS 120.

The 1st BS 110 is a BS supporting an LTE system, whereas the 2nd BS 120 may also support other communication protocols such as a wireless local area network (WLAN) in addition to LTE. The 1st BS 110 and the 2nd BS 120 may be associated with a carrier aggregation (CA) environment, and a specific cell of the 1st BS 110 may be a primary cell. Alternatively, the 1st BS 110 and the 2nd BS 120 may be associated with a dual connectivity environment, and a specific cell of the 1st BS 110 may be a primary cell. In general, the 1st BS 110 having the primary cell has wider coverage than the 2nd BS 120. The 1st BS 110 may be called a macro cell. The 2nd BS 120 may be called a small cell, a femto cell, or a micro cell. The 1st BS 110 may operate the primary cell and zero or more secondary cells. The 2nd BS 120 may operate one or more secondary cells. The secondary cell may be activated/deactivated by an indication of the primary cell.

The above description is for exemplary purposes only. The 1st BS 110 may correspond to the primary cell, and the 2nd BS 120 may correspond to the secondary cell, so that the cell can be managed by one BS.

The licensed band is a band in which an exclusive use is guaranteed to a specific communication protocol or a specific provider.

The unlicensed band is a band in which various communication protocols coexist and a shared use is guaranteed. The unlicensed band may include 2.5 GHz and/or 5 GHz band used in a WLAN.

It is assumed in the unlicensed band that a channel is occupied basically through contention between respective communication nodes. Therefore, in communication in the unlicensed band, it is required to confirm that signal transmission is not achieved by other communication nodes by performing channel sensing. For convenience, this is called a listen before talk (LBT), and if it is determined that signal transmission is not achieved by other communication nodes, this case is defined as confirmation of clear channel assessment (CCA).

The LBT must be performed preferentially in order for a BS or wireless device of an LTE system to have access to a channel in the unlicensed band. Further, when the BS or wireless device of the LTE system transmits a signal, an interference problem may occur since other communication nodes such as the WLAN or the like also perform the LBT. For example, in the WLAN, a CCA threshold is defined as −62 dBm as to a non-WLAN signal and is defined as −82 dBm as to a WLAN signal. This means that interference may occur in an LTE signal due to other WLAN devices when the LTE signal is received with power less than or equal to −62 dBm.

Hereinafter, when it is said that 'LBT is performed' or 'CCA is performed', it implies that whether a channel is idle or is used by another node is confirmed first and thereafter the channel is accessed.

Hereinafter, the LTE and the WLAN are described for example as a communication protocol used in the unlicensed band. This is for exemplary purposes only, and thus it may also be said that a 1st communication protocol and a 2nd communication protocol are used in the unlicensed band. A BS supports the LTE. A UE is a device supporting the LTE.

Hereinafter, although it is described that downlink (DL) transmission is based on transmission performed by a BS and uplink (UL) transmission is based on transmission performed by a UE, the DL transmission and the UL transmission may also be performed by a transmission node or node group in a wireless network. The UE may imply an individual node which exists for each user, and the BS may imply a central node for transmitting/receiving and controlling data for a plurality of individual nodes. From this perspective, the term 'BS' may be replaced with a DL node, and the term 'UE' may be replaced with a UL node.

Hereinafter, a cell (or a carrier) operating in an unlicensed band is called an unlicensed cell. A cell operating in a licensed band is called a licensed cell. For clarity, it is assumed that the licensed cell is a primary cell and the unlicensed cell is a secondary cell.

Transmission using a very short wavelength is considered in a next-generation communication system. In doing so, more antennas can be installed in the same area. For example, a wavelength is 1 cm in a 30 GHz band, and 100 antenna elements can be installed in total in a form of a two-dimensional array with an interval of 0.5λ, on a panel of 5 by 5 cm. A beamforming gain may be increased to increase coverage or to significantly improve throughput.

Since a very short wavelength is used, one very narrow beam may be transmitted at one time point. Although coverage capable of serving the wireless device increases, it may be necessary to align a beam direction to the wireless device due to an excessively narrow angle. When a wide beam is transmitted using the same transmission (TX) power, coverage to be supported may be reduced.

Hereinafter, coverage refers to a maximum distance in which a signal transmitted by a BS can arrive at a UE with proper reception (RX) quality. A narrow beam refers to a beam which supports small directivity and great coverage by supporting a small angle of arrival with respect to a direction of directivity. A wide beam refers to a beam which supports great directivity and small coverage by supporting a great angle of arrival with respect to a direction of directivity.

When a TX node transmits a narrow beam by using beamforming, interference caused by another node may not be effectively predicted only with a carrier sense (CS) operation.

Figure 2:
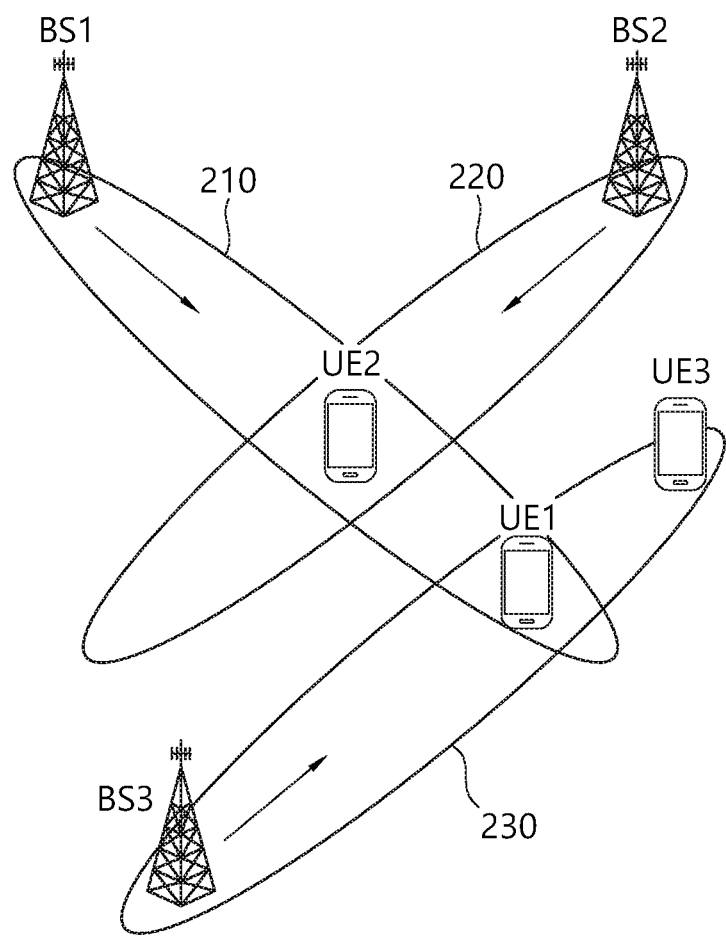
FIG. 2 shows an example of interference which occurs when a narrow beam is used.

FIG. 2 shows an example of interference which occurs when a narrow beam is used.

Before a BS1 transmits a narrow beam 210 to a UE1, CS is performed to verify whether a corresponding wireless medium is idle. However, the BS1 cannot detect a narrow beam 220 transmitted by a BS2 to a UE2 or a narrow beam 230 transmitted by a BS3 to a UE3. Therefore, when the BS1 transmits the narrow beam 210, it is difficult to avoid interference caused by the narrow beam 230 with respect to the UE or interference caused by the narrow beam 220 with respect to the UE2.

Hereinafter, a method for detecting and avoiding interference between narrow beams is proposed. Hereinafter, a node for performing CS to transmit a beam is referred to as a TX node, and a target of a beam caused by the TX node is referred to as a target reception (RX) node.

If the TX node fails to form an RX narrow beam corresponding to a TX direction of a narrow beam, CS may be performed in a wide beam direction. It is to confirm CCA in an RX wide beam direction including a TX narrow beam direction. Although interference avoidance cannot always be guaranteed, partial interference avoidance is possible. Since a radio frequency (RF) structure of a TX antenna and an RF structure of an RX antenna are different depending on capability of the communication node, there may be a decrease in accuracy in which directivity of a TX beam and directivity of an RX beam are matched to each other. The accuracy in which the TX beam and the RX beam can be matched to each other is referred to as TX-RX beam correspondence quality. A communication node of which TX-RX beam correspondence quality does not meet a specific level may use a wide beam (an omnidirectional beam or a beam for receiving energy at a greater angle than a TX beam) in signal reception for CS even if a narrow beam is used in signal transmission. The UE may report its TX-RX beam correspondence quality to the BS. The BS may determine whether to apply a narrow beam or a wide beam to the CS according to the reported quality. The BS may instruct to the UE whether to apply the narrow beam or the wide beam to the CS.

Figure 3:
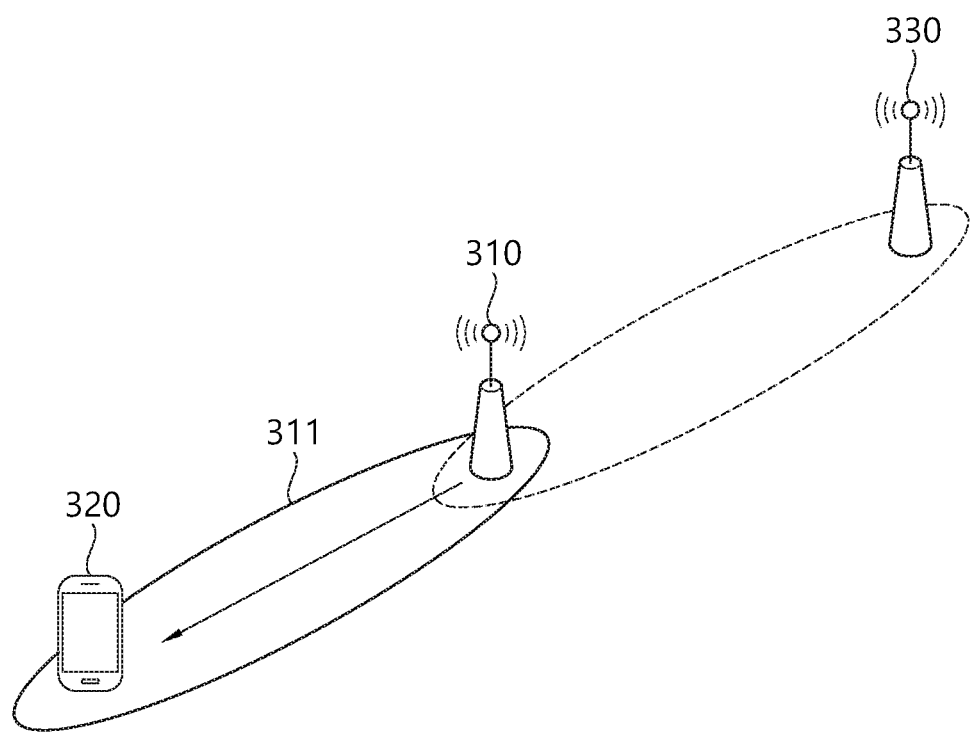
FIG. 3 shows a communication method according to an embodiment of the present invention.

FIG. 3 shows a communication method according to an embodiment of the present invention.

A TX node 310 performs CS in a direction opposite to a TX direction of a narrow beam 311. When the TX node 310 transmits the narrow beam 311 to a target RX node 320, interference to the target RX node 320 may be generated by a node 330 located in a direction opposite to the TX direction of the narrow beam 311. The TX node 310 may perform the CS by forming an RX narrow beam in an opposite direction before transmitting a narrow beam to the target RX node 320. The operation of performing the CS in an opposite direction of a TX narrow beam may be performed in parallel with an operation of performing the CS in the same direction as the TX narrow beam or other CS operations. When performing the CS in the opposite direction, a threshold for declaring CCA may be set to be higher than a threshold for performing the CS in an original direction.

As a simple example, when $\lambda$ denotes a carrier wavelength, beam directivity of a one-dimensional array antenna including antenna elements spaced apart by an interval of $\lambda/4$ may be approximately $\sin\theta = -(\pi/2)\varphi$. Herein, $\theta$ denotes an RX beam directivity angle for the array antenna, and $\varphi$ denotes an RX phase difference between the antenna elements. When a signal is to be transmitted in a direction $\theta=\pi/2$, in order to perform CS in an opposite direction $\theta=-\pi/2$, the CS may be performed by setting an RX phase difference to $\varphi=2/\pi$ (corresponding to a direction opposite to $\varphi=-2/\pi$ (matched to a TX direction).

Figure 4:
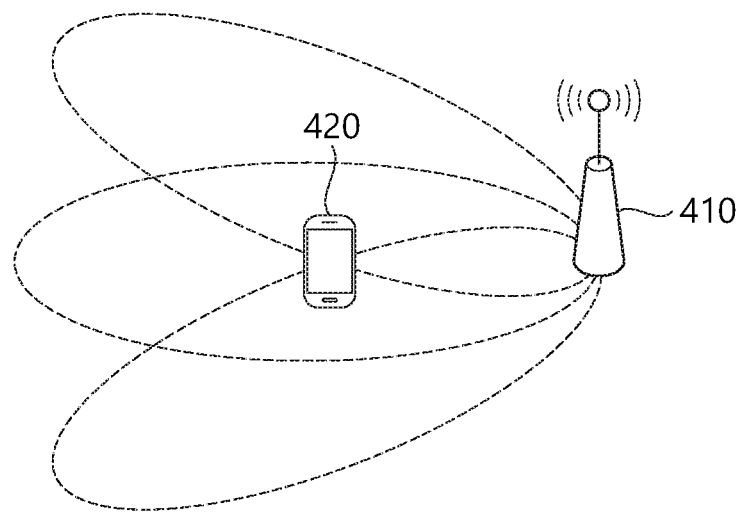
FIG. 4 shows a communication method according to another embodiment of the present invention.

FIG. 4 shows a communication method according to another embodiment of the present invention.

A TX node 410 may perform CS for a plurality of beam directions through RX narrow beam sweeping. The TX node 410 may transmit a signal to a target RX node 420 in a plurality of TX beam directions. The TX node 410 may sequentially perform the CS according to the plurality of TX beam directions, and may transmit the signal in a beam direction in which CCS is confirmed. If the CCA is not confirmed in a beam direction in which best RX quality is estimated for the target RX node 420, the TX node 410 may transmit the signal in a beam direction in which second best RX quality is estimated and in which CCA is confirmed.

Figure 5:
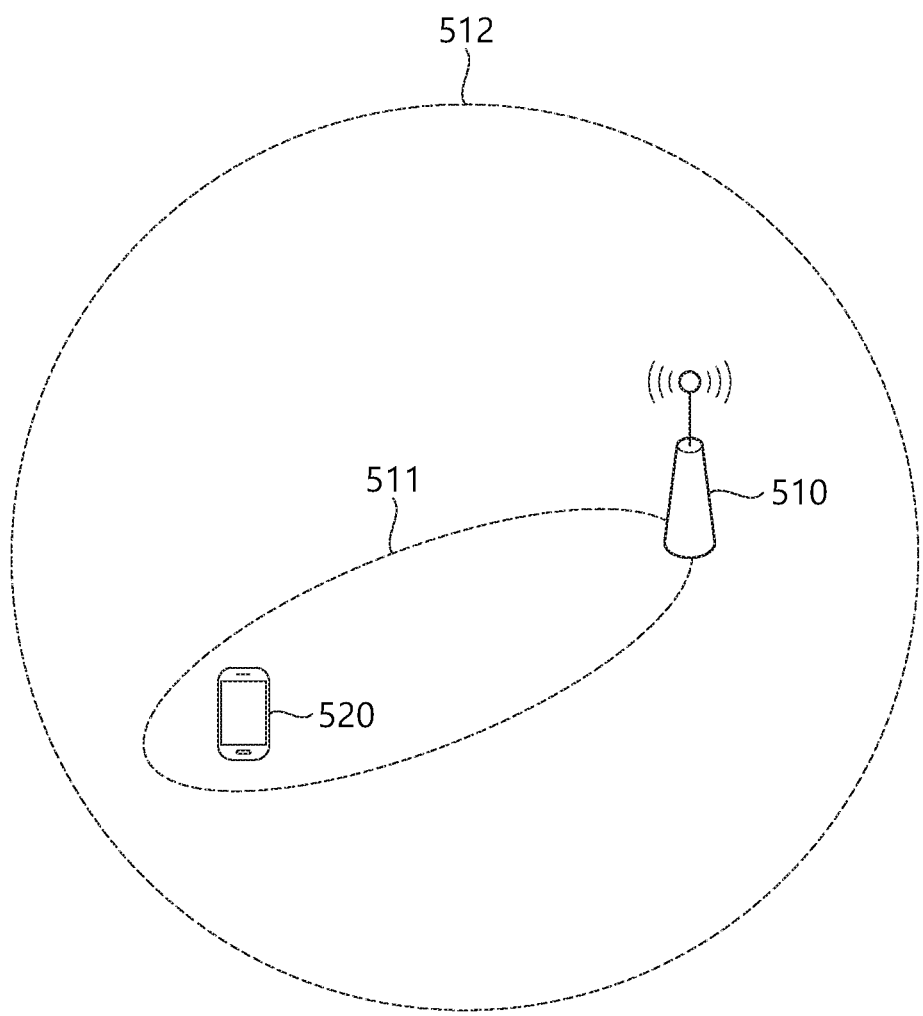
FIG. 5 shows a communication method according to another embodiment of the present invention.

FIG. 5 shows a communication method according to another embodiment of the present invention.

A TX node 510 simultaneously transmits a narrow beam 511 and a wide beam 512 with respect to a target RX node 520. The wide beam 512 is a beam having a wider beam width than the narrow beam 511 or having omnidirectional directivity.

The wide beam 512 may be transmitted in a frequency band other than the narrow beam 511, or may be transmitted in a wider band including a band in which the narrow band 511 is transmitted. TX power of the wide beam 512 may be less than TX power of the narrow beam 511.

Other communication nodes may attempt to detect the wide beam 512, and if detected energy of the wide beam 512 is greater than a threshold, may abandon or delay signal transmission.

Figure 6:
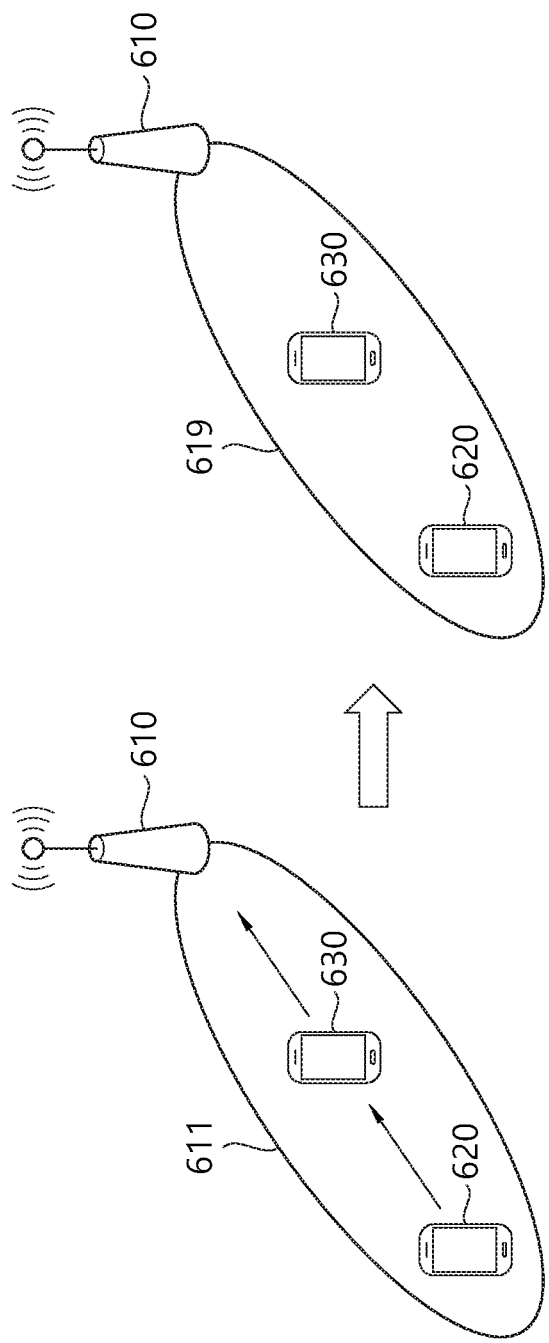
FIG. 6 shows a communication method according to another embodiment of the present invention.

FIG. 6 shows a communication method according to another embodiment of the present invention.

A TX node 610 transmits a preemption signal 611 in substantially the same direction as a narrow beam signal (i.e., a data signal) 619 to be transmitted to a target RX node 620. It can be said that the data signal 619 and the preemption signal 611 are transmitted using a narrow beam having substantially the same width and the same direction. Nodes which have received the preemption signal 611 transmit a feedback signal to the TX node 610. The TX node 610 may determine whether to transmit the data signal 619 according to the feedback signal.

The target RX node 620 which has received the preemption signal 611 targeting itself transmits a ready signal. The target RX node 620 may transmit the ready signal when a level of a current interference signal is less than or equal to any threshold.

The communication node 630 which has received the preemption signal 611 not targeting itself may transmit a stop signal or a hold signal. The communication node 630 may transmit the stop signal or the hold state when the level of the current interference signal is less than or equal to any threshold. The communication node 630 may transmit the stop signal when it is currently receiving a signal from a different node or is expected to receive the signal.

The TX node 610 may transmit the data signal 619 when the ready signal is received from the target RX node and the stop signal is not received from the other nodes.

When another TX node receives the ready signal from any target RX node, signal transmission may not start or may stop for the communication node 630 which has transmitted the ready signal. The TX node may resume signal transmission upon receiving the ready signal from the target RX node.

The preemption signal 611 may include information regarding an identifier of the target RX node 620. The identifier of the target RX node 620 may be directly scrambled to the preemption signal 611 or may be masked to a cyclic redundancy check (CRC) of the preemption signal 611.

As another embodiment, the TX node may transmit the preemption signal, and other nodes may determine whether to transmit a signal on the basis of detection of the preemption signal. The TX node transmits a probe signal through a predetermined time and/or predetermined frequency band with respect to each available narrow beam direction. The probe signal is a signal predefined for each narrow beam direction. An RX node measures interference from each probe signal and reports this to a TX node corresponding to itself. The TX node may have established information regarding a level of interference caused by each potential target RX node from the probe signal.

In addition, the TX node transmits the preemption signal before the data signal for the target RX node is transmitted. The preemption signal is a signal for transmitting a probe signal associated with a corresponding narrow beam or a signal associated with the probe signal in a wide-beam direction (or omni-direction). The preemption signal may be transmitted while changing in a plurality of narrow beam directions on a time axis or may be transmitted through a predefined wide beam direction.

Another potential TX node which has received the preemption signal may avoid interference between TX signals by not transmitting signals to a potential RX node which has reported greater RX interference with respect to a probe signal associated with the preemption signal.

It is possible to avoid simultaneous transmission of a narrow beam direction signal which causes RX interference through a backhaul between TX nodes. When the backhaul exists between the TX nodes such as a BS of a cellular system, interference information regarding RX nodes depending on a narrow beam direction may be established through a probe signal or the like, and this information may be shared between neighboring TX nodes. In this case, interference between narrow beam signals can be avoided in the following manner.

First, a time duration in which each narrow beam direction transmission is possible is predetermined so that narrow beam directions causing interference between neighboring TX nodes do not occur at the same time. A time duration in which each narrow beam direction transmission (narrow beam direction may be exchanged through probe signal information associated with the narrow beam direction) is desired or a time duration in which narrow beam direction transmission is not desired may be exchanged between the TX nodes.

Second, if information can be exchanged relatively quickly between neighboring TX nodes through a backhaul, each TX node delivers information regarding a narrow beam direction (e.g., probe signal information associated with the narrow beam direction) before transmitting a narrow beam signal. The neighboring TX node may request the TX node to inform whether to stop corresponding narrow beam direction transmission through the backhaul.

The TX node may establish statistics by measuring a quasi-static interference characteristic corresponding to each TX/RX beam direction in the following manners.

Location information of potential TX/RX nodes
CS result statistics for each TX direction
Statistics on an interference level for a probe signal transmitted by potential TX nodes or a probe signal transmitted by a TX node On the basis of the statistics established in the aforementioned manner, the TX node may adjust a CCA threshold or (maximum) TX power according to an interference level expected in a direction in which the TX node transmits a beam. The TX node may set the CCA threshold or the (maximum) TX power such that the greater the interference level expected in the beam TX direction, the smaller the CCA threshold of the (maximum) TX power.

The TX node transmits a probe signal in each beam direction so that RX nodes can predict an interference level for a direction of a beam transmitted by itself. The probe signal may be generated by a downlink synchronization signal based on 3GPP LTE, a channel state information-reference signal (CSI-RS), a sounding reference signal (SRS), a physical random access channel (PRACH), or a combination thereof. The SRS or the PRACH may be used as a probe signal between BSs. The downlink synchronization signal or the CSI-RS may be used as a probe signal between UEs.

Figure 7:
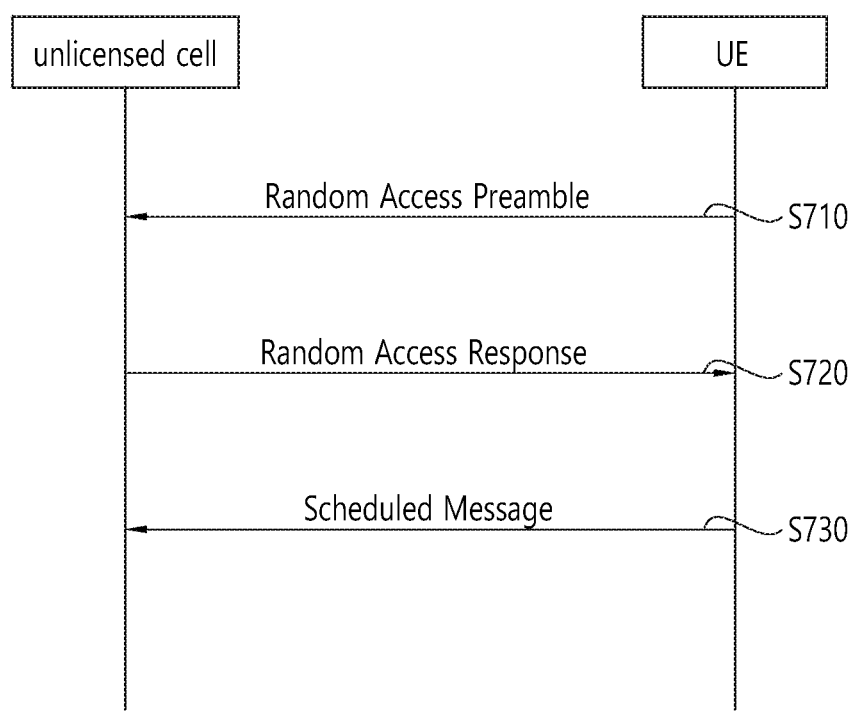
FIG. 7 shows a random access method in an unlicensed band according to an embodiment of the present invention.

FIG. 7 shows a random access method in an unlicensed band according to an embodiment of the present invention.

Upon verifying that a channel is idle by performing CS, a UE transmits a random access preamble to an unlicensed cell (S710). The UE may select and transmit any one of a plurality of candidate random access preambles. Alternatively, the UE may transmit the random access preamble by an instruction from a primary cell.

The unlicensed cell transmits a random access response in a specific time duration (S720). The random access response includes a UL timing advance (TA), UL power control information, and UL scheduling information for transmission of a scheduled message.

The UE transmits the scheduled message according to the UL scheduling information at a time associated with an RX time of the random access response (S730). The scheduled message may have a meaning of collision resolution.

LBT may be applied before the UE transmits the scheduled message in an unlicensed band. If the LBT has failed and thus the scheduled message cannot be transmitted, there is an ambiguity in that the unlicensed cell cannot know whether the UE has not been able to receive the random access response or has failed in the LBT of the scheduled message.

In an embodiment, the UE may transmit the scheduled message through one subframe which has succeeded in the LBT among a plurality of candidate subframes. The number of the candidate subframes and positions thereof may be configured through RRC signaling or may be included in the random access response.

In another embodiment, when a plurality of unlicensed cells are configured, the UE may transmit the scheduled message through an unlicensed cell which has succeed in the LBT among a plurality of candidate unlicensed cells. The plurality of candidate unlicensed cells may be configured through RRC signaling or may be included in the random access response.

Figure 8:
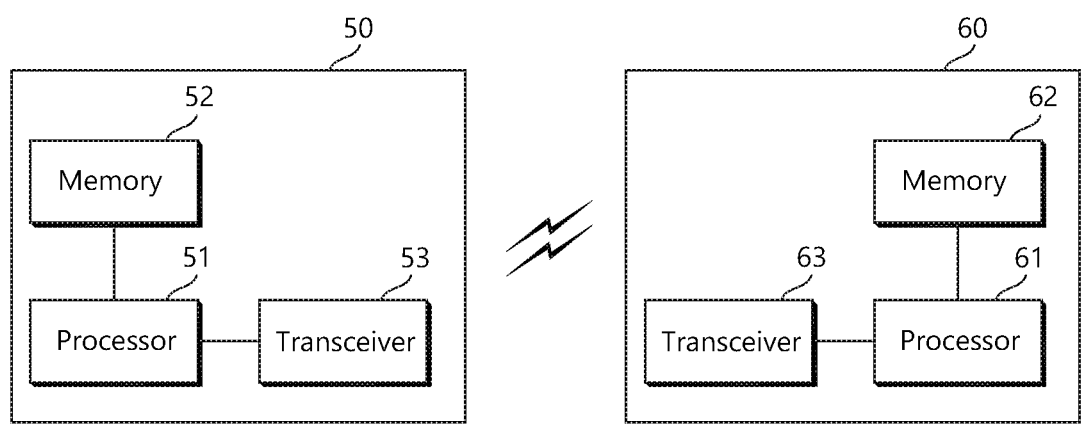
FIG. 8 is a block diagram showing a wireless communication system according to an embodiment of the present invention.

FIG. 8 is a block diagram showing a wireless communication system according to an embodiment of the present invention.

A wireless device 50 includes a processor 51, a memory 52, and a transceiver 53. The memory 52 is coupled to the processor 51, and stores various instructions executed by the processor 51. The transceiver 53 is coupled to the processor 51, and transmits and/or receives a radio signal. The processor 51 implements the proposed functions, procedures, and/or methods. In the aforementioned embodiment, an operation of the UE may be implemented by the processor 51. When the aforementioned embodiment is implemented with a software instruction, the instruction may be stored in the memory 52, and may be executed by the processor 51 to perform the aforementioned operation.

ABS 60 includes a processor 61, a memory 62, and a transceiver 63. The BS 60 may operate in an unlicensed band. The memory 62 is coupled to the processor 61, and stores various instructions executed by the processor 61. The transceiver 63 is coupled to the processor 61, and transmits and/or receives a radio signal. The processor 61 implements the proposed functions, procedures, and/or methods. In the aforementioned embodiment, an operation of the BS may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The transceiver may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for communicating by a transmission (TX) node in an unlicensed band, the method comprising:
transmitting a preemption signal for preempting at least one communication node to start communication to a target reception (RX) node in the unlicensed band; and
based on receiving a ready signal from the target RX node and not receiving a hold signal, transmitting a data signal to the target RX node in the unlicensed band,
wherein the preemption signal is transmitted by using a narrow beam having substantially the same width and direction as the data signal, and
wherein an identifier of the target RX node is masked to a cyclic redundancy check (CRC) of the preemption signal.

2. The method of claim 1, further comprising:
stopping a transmission of the data signal until another ready signal is received again from the target RX node if the hold signal is received from the at least one communication node.

3. A device for operating in an unlicensed band, the device comprising:
a transceiver configured to transmit and receive a radio signal; and
a processor operatively coupled to the transceiver and configured to:
transmit a preemption signal for preempting at least one communication node to start communication to a target reception (RX) node in the unlicensed band; and
based on receiving a ready signal from the target RX node and not receiving a hold signal, transmit a data signal to the target RX node in the unlicensed band,
wherein the preemption signal is transmitted by using a narrow beam having substantially the same width and direction as the data signal, and
wherein an identifier of the target RX node is masked to a cyclic redundancy check (CRC) of the preemption signal.

4. The device of claim 3, wherein the processor is configured to stop a transmission of the data signal until another ready signal is received again from the target RX node if the hold signal is received from the at least one communication node.

* * * * *